United States Patent
Teshima et al.

(10) Patent No.: US 8,263,771 B2
(45) Date of Patent: Sep. 11, 2012

(54) METHOD FOR MANUFACTURING DISPERSION OF QUINOLINE DERIVATIVE

(75) Inventors: Takayuki Teshima, Yokohama (JP); Kazumichi Nakahama, Tokyo (JP); Akira Kuriyama, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 457 days.

(21) Appl. No.: 12/174,052

(22) Filed: Jul. 16, 2008

(65) Prior Publication Data

US 2009/0020043 A1 Jan. 22, 2009

(30) Foreign Application Priority Data

Jul. 20, 2007 (JP) ................................. 2007-190016

(51) Int. Cl.
*C07D 515/00* (2006.01)

(52) U.S. Cl. .......................................... 546/49; 546/56

(58) Field of Classification Search ................... 546/152, 546/181, 49, 56
See application file for complete search history.

(56) References Cited

U.S. PATENT DOCUMENTS

| | | | |
|---|---|---|---|
| 4,064,129 A * | 12/1977 | Gerson et al. | .................... 546/49 |
| 4,734,137 A | 3/1988 | Kasahara et al. | |
| 5,085,698 A | 2/1992 | Ma et al. | |
| 5,679,138 A | 10/1997 | Bishop et al. | |
| 2005/0109240 A1 * | 5/2005 | Maeta et al. | ................... 106/493 |
| 2006/0260510 A1 | 11/2006 | Maeta et al. | |

FOREIGN PATENT DOCUMENTS

| | | |
|---|---|---|
| JP | 5-27664 B2 | 4/1993 |
| JP | 9-176543 A | 7/1997 |
| JP | 9-221616 A | 8/1997 |
| JP | 6-96679 B2 | 5/1999 |
| JP | 11-130974 A | 5/1999 |
| JP | 2005-307154 A | 11/2005 |

OTHER PUBLICATIONS

Lii etal, Microfluidics, Aug. 18, 2006, Kirk -Othmer Encyclopedia of Chemical Technology, vol. 26, p. 959-980.*

* cited by examiner

*Primary Examiner* — Taylor Victor Oh
(74) *Attorney, Agent, or Firm* — Fitzpatrick, Cella, Harper & Scinto

(57) ABSTRACT

A method for manufacturing a dispersion of a quinoline derivative that is dispersed at a high concentration and has a small particle size. The method includes the steps of preparing a solution by dissolving an N-arylanthranilic acid derivative in an organosulfonic acid, heating the solution and obtaining a reaction liquid in which a quinoline derivative has been produced by a condensation ring-closing reaction, and obtaining a dispersion of the quinoline derivative by mixing the reaction liquid with an aqueous solution. The step of mixing the reaction liquid with an aqueous solution may be performed in a mixing field having a micro-channel.

10 Claims, 2 Drawing Sheets

METHOD FOR MANUFACTURING DISPERSION OF QUINOLINE DERIVATIVE

BACKGROUND OF THE INVENTION

1. Field of the Invention

The present invention relates to a method for manufacturing a dispersion of a quinoline derivative that is suitable for a variety of functional substance materials.

2. Description of the Related Art

Agricultural chemicals, such as herbicides and insecticides, drugs, such as anticancer drugs, antiallergic drugs, and antiinflammation agents, and colorants, such as inks and toners containing coloration agents, are well known examples of dispersion materials containing functional substances. Among these materials, quinoline compounds are known as intermediates for agricultural chemicals and drugs and also as organic electroluminescent (EL) materials. They have also found a wide application as colorants, and some of them are known to be used as pigments. A remarkable progress has been achieved in recent years in the field of digital printing technology. Electrophotography and ink jet technology are typical representative of digital printing technology, and the presence thereof as imaging technology in offices and homes has recently become more and more noticeable.

A direct recording method, as one of the ink jet methods, can be implemented with compact equipment and features low power consumption.

Further, miniaturization of nozzles has rapidly advanced the quality of images. In one of the methods representing ink jet technology, ink supplied from an ink tank is evaporated and bubbled by heating with a heater located in a nozzle and the ink is ejected to form an image on a recording medium. In another example, ink is ejected from a nozzle by inducing oscillations with a piezo element.

The ink used in these methods is typically in the form of an aqueous dye solution. As a result, bleeding can occur in the zones where colors overlap, or a phenomenon called feathering sometimes occurs in the paper fiber direction in the recording locations on the recording medium. U.S. Pat. No. 5,085,698 discloses using a pigment dispersion ink to overcome these drawbacks.

However, in most cases, the pigment dispersion inks are inferior to dye inks in terms of coloration ability. Thus, because pigment particles cause color scattering and color reflection, the coloration ability of images formed by pigment inks is generally inferior to that of the images obtained with dye inks. Further, coarse pigment particles cause nozzle clogging in the ink jet head.

Decreasing the size of the pigment particles has been attempted as a method for overcoming the above-described drawbacks of pigment inks. Pigments reduced in size to 100 nm or less demonstrate a low level of light scattering and have a larger surface area. This should result in an improvement in coloration ability. However, conventional methods have been unable to solve the problems associated with this approach.

Pigment dispersion ink is typically obtained by dispersing a usual water-insoluble organic pigment in an aqueous medium. This process includes a step of adding the pigment to an aqueous medium containing a dispersant and then finely grinding in a dispersion apparatus, such as a sand mill or a ball mill, using hard beads. A substantial problem associated with such process is how to obtain a fine and stable pigment dispersion.

Japanese Patent Laid-open No. 9-176543 discloses a method for obtaining an organic pigment particle dispersion with a particle size equal to or less than 100 nm via a high-speed mill dispersion using beads. While a fine dispersion can be reliably obtained using this method, a large amount of energy is required for the dispersion process. Also, a complex process is necessary to separate the obtained dispersion liquid from the beads.

On the other hand, a method for obtaining fine particles of a pigment by dissolving the pigment and then precipitating it again has been suggested.

Japanese Patent Laid-Open No. 9-221616 suggests producing fine particles by an acid pasting method in which an organic pigment is dissolved using sulfuric acid. However, this method fails to produce pigments with a particle size of 100 nm or less.

Japanese Patent Publication Nos. 5-27664 and 6-96679 and Japanese Patent Laid-Open No. 11-130974 describe methods for obtaining fine pigment particles by dissolving an organic pigment together with a dispersant in an aprotic polar solvent in the presence of an alkali and then neutralizing with an acid and precipitating the pigment.

In these methods, poorly soluble pigments are dissolved. Therefore, the amount of the solvent necessary for dissolving the pigment is large, which makes a high-concentration dispersion difficult to produce.

In the first embodiment of Japanese Patent Publication No. 6-96679, 300 parts of dimethylsulfoxide is used per 30 parts of a pigment. Using a large amount of organic solvent increases not only the cost of production, but can also increase the cost of the wastewater treatment. Furthermore, although the dispersion obtained can be concentrated by distilling the solvent off under reduced pressure or by ultrafiltration, a significant amount of effort and time are still required for obtaining a high-concentration dispersion.

In sum, in the manufacture of pigment dispersions using the above-described conventional re-precipitation method, more specifically, a method in which a pigment solution is mixed with a liquid that decreases the solubility of the pigment and pigment particles are precipitated, a large amount of solvent is required because of poor solubility of the pigment and a high-concentration dispersion is difficult to manufacture.

Japanese Patent Laid-Open No. 2005-307154 discloses a method for producing 2,9-dimethylquinacridone by a synthesis using a capillary as a reactor. In this synthesis reaction, a starting material is mixed with p-toluenesulfonic acid, dimethylformamide and ethylene glycol, the mixed solution is passed through a capillary heated in an oil bath, and 2,9-dimethylquinacridone is synthesized.

However, since p-toluenesulfonic acid is solid at normal temperature, it is difficult to pass it through a capillary. Also, because a solvent is used, it is typically difficult to obtain 2,9-dimethylquinacridone at a high concentration. Furthermore, in order to obtain 2,9-dimethylquinacridone using water as a dispersion medium, a phase transition to water is necessary, and there is a risk of causing an additional decrease in concentration.

Moreover, when the synthesis is performed in the presence of a dispersant, there is also a risk that the dispersant will dissolve at a high temperature under acidic conditions, thereby limiting a number of suitable dispersants.

SUMMARY OF THE INVENTION

The present invention provides a method for manufacturing a high-concentration dispersion of a quinoline derivative that has a small particle size.

The method for manufacturing a dispersion of a quinoline derivative in accordance with the present invention comprises the steps of preparing a solution by dissolving an N-arylanthranilic acid derivative in an organosulfonic acid; heating the solution and obtaining a reaction liquid in which a quinoline derivative has been produced by a condensation ring-closing reaction; and obtaining a dispersion of the quinoline derivative by mixing the reaction liquid with an aqueous solution in the presence of a dispersant.

Preferably, the step of preparing a solution by dissolving an N-arylanthranilic acid derivative in an organosulfonic acid is accompanied by heating.

Preferably, the step of mixing the reaction liquid with an aqueous solution in the presence of a dispersant is performed at a temperature lower than the temperature at which the condensation ring-closing reaction is performed.

Preferably, the step of mixing the reaction liquid with an aqueous solution in the presence of a dispersant is performed in a mixing field, which can have, for example, an open space or having a micro-channel.

Preferably, the reaction liquid and/or an aqueous solution is supplied from a micro-sized flow channel. The aqueous solution is preferably water or an acidic, neutral, or alkaline aqueous solution.

In addition to providing a high-concentration dispersion of a quinoline derivative that has a small particle size, the present invention also expands the number of dispersants that can be used. This is because the dispersant is not present in the condensation ring-closing reaction step performed at a high-temperature under acidic conditions and the derivative is dispersed using the dispersant in a subsequent step.

Furthermore, the manufacturing cost can be reduced because the high-concentration dispersion of a quinoline derivative can be produced using a reduced amount of the solvent.

Using the method for manufacturing a dispersion of a quinacridone derivative in accordance with the present invention, it is possible to produce a pigment dispersion suitable for use as a colorant. Therefore, a pigment dispersion with high coloration ability can be obtained.

Other features of the present invention will become apparent from the following description of exemplary embodiments with reference to the attached drawings.

DESCRIPTION OF THE EMBODIMENTS

Figure 1:
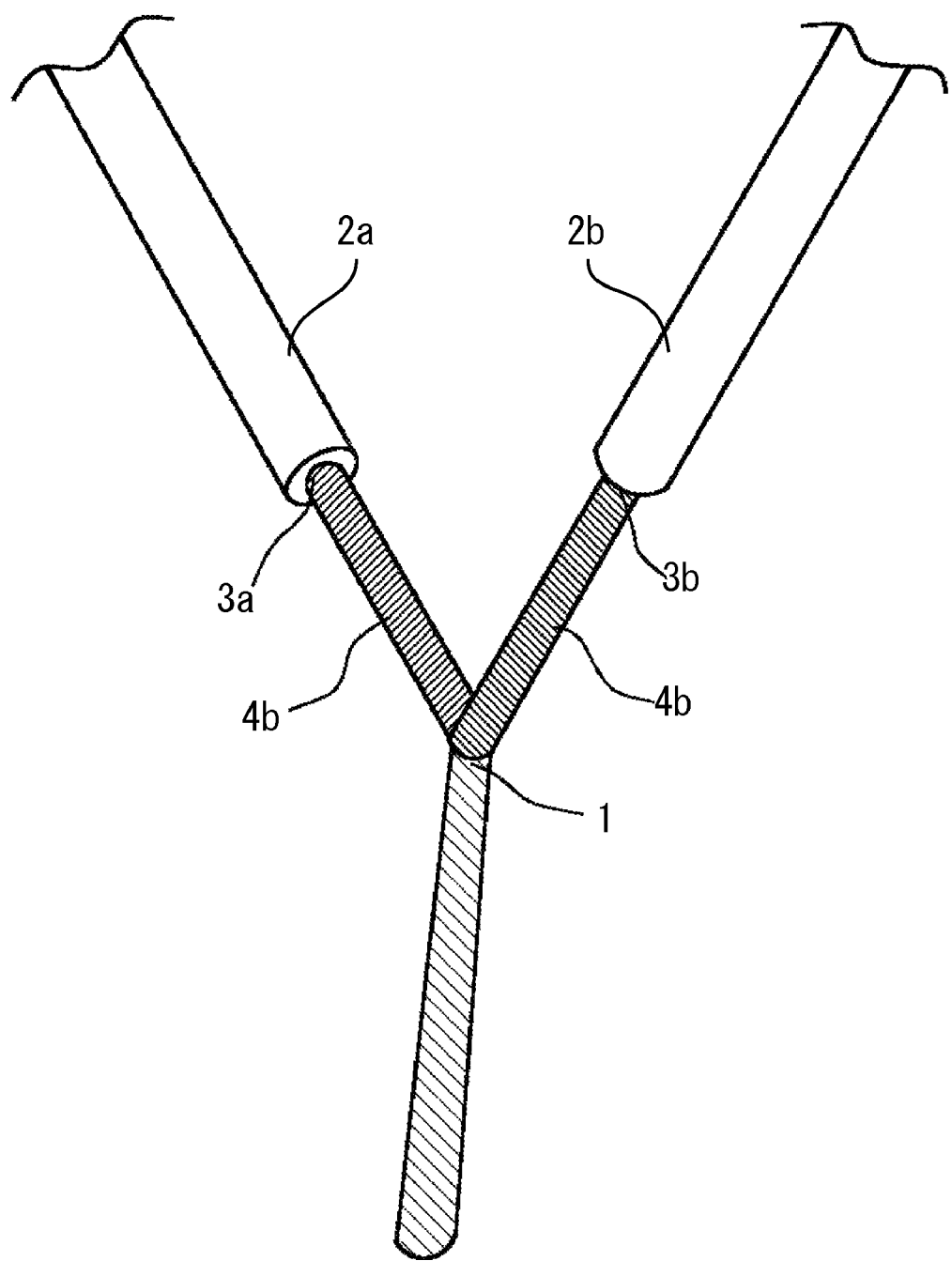
FIG. 1 illustrates schematically micro-sized flow channels and the mixing field used in Example 1 of the present invention.

The present invention provides a method for manufacturing a dispersion of a quinoline derivative by which the quinoline derivative is produced by a condensation ring-closing reaction from an N-arylanthranilic acid derivative and is dispersed in a dispersion medium with a dispersant.

The quinoline derivative obtained by a manufacturing method in accordance with the present invention is a compound having a structure represented by General Formula (1) below:

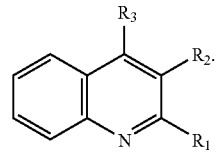

General Formula (1)

In the formula, $R_1$ and $R_2$ are independently selected from a linear, branched, or cyclic saturated or unsaturated alkyl group, aliphatic group, or aromatic group; $R_3$ is a hydroxyl group, an alkyl group, an aliphatic group, or an aryl group.

Specific examples of the compound having the structure represented by General Formula 1 include 4-amino-2-methylquinoline, benzo[f]quinoline, 2,2'-bi-4-lepidine, 2-chlorolepidine, quinacridone, and 2,9-dimethylquinacridone.

The N-arylanthranilic acid derivative, which is a starting material used in the method for manufacturing a dispersion of a quinoline derivative in accordance with the present invention, is a compound having a structure represented by General Formula (2) below:

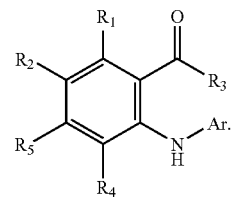

General Formula (2)

In the formula, $R_1$, $R_2$, $R_4$ and $R_5$ are independently selected from a linear, branched, or cyclic saturated or unsaturated alkyl group, aliphatic group, or aromatic group; $R_3$ is a hydroxyl group, an alkoxy group, an alkyl group, an aliphatic group, or an aryl group. Ar is an aryl group.

Specific examples of the compound having the structure represented by General Formula (2) include N-phenylanthranilic acid, N-(3-chloro-2-methylphenyl)anthranilic acid, N-benzylanthranilic acid, 2,5-di-p-toluidinoterephthalic acid, 2,5-di-p-toluidinoterephthalic acid methyl ester, 2,5-di-anilinoterephthalic acid, and 2,5-di-anilinoterephthalic acid methyl ester.

In the method for manufacturing a dispersion of a quinoline derivative in accordance with the present invention, an N-arylanthranilic acid derivative is dissolved in an organosulfonic acid to obtain a solution. The solution is then heated and a reaction liquid is obtained in which a quinoline derivative is generated by a condensation ring-closing reaction. Because the quinoline derivative produced forms a salt with the organosulfonic acid, precipitation of the particles derived from the quinoline derivative hardly occurs in this state. For this reason, the quinoline derivative can be present in the solution in the oversaturated state.

A dispersant is then added to the reaction liquid. The temperature at which the dispersant is added is preferably a temperature at which this dispersant does not dissolve. Therefore, it is not necessary to limit the dispersants to those resistant to a high-temperature acidic environment, and the selection range of dispersants is expanded. The reaction liquid with the dispersant added thereto may then be mixed in a mixing field with water or an acidic, neutral, or alkaline aqueous solution to produce an aqueous dispersion of the quinoline derivative. When the reaction liquid having the dispersant added thereto no longer has flowability, it may be heated to a temperature equal to or higher than the melting point of the organosulfonic acid. Here, a salt with the organosulfonic acid is formed, the quinoline derivative is hydrolyzed and fine particles of the quinoline derivative are precipitated. Because the dispersant was added in advance, a dispersion of the quinoline derivative is obtained. By precipitating the quinoline derivative in the presence of a dispersant, it is possible to disperse the quinoline derivative before it has grown to form coarse particles. Therefore, the dispersion with a small particle size can be obtained.

Where the N-arylanthranilic acid derivative is dissolved in the organosulfonic acid without using a solvent and a condensation ring-closing reaction is performed from the solution, the dispersion of the quinoline derivative that is subsequently obtained can be provided at a high concentration. The possibility of producing the dispersions of quinoline derivatives at a high concentration and without using a solvent effectively decreases the production cost.

Each step of the method for manufacturing a dispersion of a quinoline derivative in accordance with the present invention is described below in more detail with reference to specific non-limiting illustrative examples. In the method for manufacturing a dispersion of a quinoline derivative in accordance with the present invention, a step is performed in which an N-arylanthranilic acid derivative is dissolved in an organosulfonic acid to produce a solution.

Examples of organosulfonic acids include alkylsulfonic acids, such as methanesulfonic acid, ethanesulfonic acid, propanesulfonic acid, and butanesulfonic acid, halogenated alkylsulfonic acids obtained by substitution of halogens, ethylbenzenesulfonic acid, octylbenzenesulfonic acid, dodecylbenzenesulfonic acid, p-toluenesulfonic acid, 2-naphthalenesulfonic acid, p-chlorobenzenesulfonic acid, and p-xylene-2-sulfonic acid, but this list is not limiting. These acids may be used individually or in combinations of two or more thereof.

When these organosulfonic acids are solids at normal temperature, they may be heated to a temperature equal to or higher than the melting point thereof to dissolve the acids. It is also preferred that no solvent be added during the dissolution. This is because the addition of the solvent decreases the concentration of the quinoline derivative in the quinoline derivative dispersion. However, a sohigh-boiling solvent can be used.

Examples of the preferred solvents of this type include dimethylsulfoxide, dimethylimidazolidinone, sulfolan, N-methylpyrrolidone, dimethylformamide, and γ-butyrolactone. Dimethylsulfoxide, N-methylpyrrolidone, dimethylformamide, and dimethylimidazolidinone are preferred. Furthermore, these solvents may be used individually or in combinations of two or more thereof.

A step is then performed in which the solution is heated and a reaction liquid is obtained in which a quinoline derivative is produced by a condensation ring-closing reaction. When the reaction liquid is produced, it is preferred that an inactive gas atmosphere of nitrogen, helium, or argon be formed during the condensation ring-closing reaction, or that the reaction be performed in a mode that cuts off the supply of oxygen or water. The temperature range of the condensation ring-closing reaction is about 60° C. to 220° C., preferably 80° C. to 210° C., and more preferably 90° C. to 170° C. A typical heating means, such as an oil bath or a thermoelectric heater, can be used for heating, or a method using microwaves may be employed. In the reaction liquid, the organosulfonic acid and quinoline derivative form a salt, and the produced quinoline derivative does not precipitate in the form of particles.

In the reaction liquid, the quinoline derivative is produced from a solution obtained by dissolving the N-arylanthranilic acid derivative in the organosulfonic acid. Therefore, the quinoline derivative can be present in an oversaturated state. Thus, a reaction liquid can be prepared in which the quinoline derivative is dissolved to a concentration higher than that obtained by dissolving the solid quinoline derivative in the organosulfonic acid. The oversaturated state as referred to herein represents a quasistable state of a solution in which the solute and the solvent maintain a single phase at the solute concentration exceeding the saturation solubility at the given temperature and pressure.

A step of adding a dispersant to the reaction liquid is then performed. A dispersant used in accordance with the present invention is preferably a dispersant that inhibits the adsorption on the particle surface and growth into coarse particles when the quinoline derivative precipitates in the form of particles and that also inhibits the aggregation of particles.

Examples of such dispersants include surfactants. Examples of suitable surfactants include anionic, nonioninc, cationic, and amphoteric surfactants.

Examples of suitable anionic surfactants include fatty acid salts, alkylsulfuric acid esters and salts, alkylarylsulfonic acid salts, alkyldiaryletherdisulfonic acid salts, dialkylsulfosuccinic acid salts, alkylphosphoric acid salts, naphthalenesulfonic acid formalin condensate, polyoxyethylene alkylphosphoric acid esters and salts, and glycerol borate fatty acid esters.

Examples of suitable nonionic surfactants include polyoxyethylene alkyl ethers, polyoxyethylene oxypropylene block copolymers, sorbitan fatty acid esters, glycerin fatty acid esters, polyoxyethylene fatty acid esters, and polyoxyethylene alkylamines.

As for the organosulfonic acid that dissolves the N-arylanthranilic acid derivative, when the dispersion of the quinoline derivative is obtained as a dispersion in alkaline water, the organosulfonic acid may function as an anionic surfactant. In this case the step of adding a dispersant to the reaction liquid can be omitted.

Examples of suitable cationic surfactants include alkylamine salts, quaternary ammonium salts, alkylpyridinium salts, and alkylimidazolium salts.

Examples of suitable amphoteric surfactants include alkylbetain, alkylamineoxide, and phosphadylcholine. Amphiphilic block copolymers can be also used, and this list is not limiting.

The temperature at which the dispersant is added to the reaction liquid is preferably lower than the temperature at which the condensation ring-closing reaction is performed. This is because the dispersant sometimes dissolves under acidic high-temperature conditions. The range of this temperature is from about 10° C. to 170° C., preferably from 20° C. to 110° C., and more preferably from 25° C. to 90° C.

In accordance with the present invention, an organosulfonic acid is preferably employed without using an inorganic acid, such as concentrated sulfuric acid, during the condensation ring-closing reaction. This is because when an inorganic acid, such as concentrated sulfuric acid, is used, a dispersant that is added is easily dissolved. On the other hand, organosulfonic acids have an acid catalytic activity only for the condensation ring-closing reaction. Therefore, even when a dispersant is added, the dispersant is hardly dissolved. In particular, the dissolution can be avoided by adding a dispersant under low-temperature conditions. As a result, a greater variety of dispersants that can be selected for use.

Also, in accordance with another aspect of the present invention, no added dispersant is present during the condensation ring-closing reaction conducted by heating. Because the reaction does not proceed under acidic high-temperature conditions in the presence of a dispersant, the dissolution of the dispersant and reaction of the dispersant and N-arylanthranilic derivative can be prevented.

Then, a step is performed in which the reaction liquid and the aqueous solution are mixed in the presence of the dispersant, and a dispersion of the quinoline derivative is obtained. In accordance with the present invention, the reaction liquid having the dispersion liquid added thereto is mixed with water or an acidic or alkaline aqueous solution in a mixing field and an aqueous dispersion of the quinoline derivative is produced. In this step, a salt of the organosulfonic acid and the quinoline derivative is hydrolyzed and the quinoline derivative is precipitated in the form of particles.

Here, the dispersant that is present is adsorbed by the particle surface and both inhibits the growth of coarse particles and the aggregation of particles, thereby making it possible to obtain an aqueous dispersion in which small-diameter quinoline derivative particles are dispersed.

When an anionic surfactant is used as the dispersant, it is preferred that mixing with an alkaline aqueous solution be performed, but it is also possible to mix with neutral water and then mix with a substance demonstrating alkaline properties to adjust the alkalinity. When a cationic surfactant is used as the dispersant, it is preferred that mixing with a weakly acidic aqueous solution or water be performed. The above-described dispersant may be also included in water or an acidic or alkaline aqueous solution that will be mixed with the reaction liquid.

The conventional well-known devices that are suitable for stirring, mixing, dispersing, and precipitating, such as ultrasound oscillators, full-zone stirring blades, stirring devices of an internal circulation type, stirring devices of an external circulation type, and flow rate and ion concentration control devices can be used as the mixing field.

In one aspect of the present invention, the reaction liquid having the dispersant added thereto and/or water or an acidic or alkaline aqueous solution are supplied into the mixing field from a micro-sized flow channel. As a result, the dispersion of a quinoline derivative can be manufactured while adjusting the flow rate of any one or both fluids. The process can be also implemented while applying heat to improve the flowability of the fluid obtained by adding the dispersant to the reaction liquid. However, the heating is preferably conducted at a temperature at which the dispersant does not decompose.

Where the two fluids are supplied from a micro-sized flow channel and mixed in a mixing field of air (open space (atmosphere) without a micro-channel that controls the fluids) by the method such as illustrated by FIG. 1, the two fluids are always mixed at the same time. Therefore, the orderliness is increased and particle size uniformity of the dispersion can be easily improved.

Furthermore, because the total amount of the fluids supplied from the micro-sized flow channel is small, rapid mixing can be performed and small-diameter particles are easily obtained.

The reason why small-diameter particles can be easily obtained when rapid mixing is performed is that instantaneous mixing produces a large number of nuclei, thereby enabling the growth of a large number of particles. As a result, crystallization (formation of particles) proceeds smoothly and particles with a small primary diameter are obtained.

From the standpoint of mixing efficiency, the length of the short side of the opening of the micro-sized flow channels for supplying the fluids to the reaction field is preferably 3000 µm or less, more preferably 1000 µm or less, even more preferably 500 µm or less, and yet more preferably 100 µm or less.

In order to facilitate the outflow of fluids from the micro-sized flow channels and to obtain the necessary fluid viscosity, the length of the short side of the opening of the micro-sized flow channels for supplying the fluids to the reaction field is preferably 10 µm or more, more preferably 50 µm or more. The length of the short side of the opening as referred to herein means the length of the shortest side of the opening surface. That is, when the opening has a circle shape, the short side means the diameter and in the case of ellipse shape, the short side means short diameter. For example, when the opening has a rectangular shape of 100 µm×1 cm, the short side is 100 µm. Where the opening size is small, the width of the fluid flow supplied to the reaction field is decreased and mixing can be performed with good efficiency. On the other hand, where the opening size increases, the flow width also increases and mixing efficiency decreases. However, when a highly viscous reaction liquid is handled, using a small opening increases the pressure loss and sometimes makes the discharge impossible. Therefore, the opening size has to be set according to the reaction liquid used.

In another aspect of the present invention, the mixing field may be a micro-channel. Also, a microreactor may be used with a micro-channel employed as the mixing field.

A microreactor is a generic name for a reaction or mixing device having a plurality of microscale flow channels.

For example, microreactors are described in detail in "Microreactors New Technology for Modern Chemistry" (Wolfgang Ehrfeld, Volker Hessel, Holger Loewe, WILEY-VCH, published in 2000), which is incorporated herein by reference.

Flow channels of the microreactors are on a micrometer scale with a flow channel width being from several microns to several hundreds or even several thousand microns. Because the size is small and the flow rate of the fluid flowing in the flow channel is also small, the Reynolds number is small. The Reynolds number as referred to herein is a ratio of an inertia force and a viscous force and represents an index typically used to distinguish a laminar flow from a turbulent flow. Typically, when the Reynolds number is more than 1000, an unstable laminar flow is produced, and when the Reynolds number is more than 2000, the flow can be considered as turbulent.

The fluid flowing in a microscale-sized or micro-sized flow channel is easier to control by a laminar flow rather than by a turbulent flow as in a typical reactor. When the flows of two liquids are in contact in a laminar flow-controlled mode, diffusion via the interface becomes a predominant factor. Furthermore, because the surface area per unit volume in a microscale-sized space, such as a micro-channel, is large, such a space is very useful for diffusion mixing at the interface where the laminar flows of two liquids are in contact with each other.

According to Fick's law, time required for the diffusion is proportional to the second power of the diffusion length. Thus, when molecular diffusion takes place, the diffusion time decreases with the decrease in the flow channel width. More specifically, where the flow channel width is decreased by a factor of 10, diffusion time is decreased by a factor of 100. Therefore, the flow channel width of a mixing flow channel in which the diffusion is performed by bringing a plurality of fluids into contact with each other is preferably 1000 µm or less, more preferably 500 µm or less, even more preferably 200 µm or less, and still more preferably 100 µm or less. Taking into account the limitations related to the flow channel manufacturing process and the particle size of the dispersion obtained, the lower limit of the flow channel width may be about 30 µm. As the flow channel width decreases, the diffusion length also decreases, thereby shortening the diffusion time and reaction time.

The mixing ratio of the reaction liquid and the aqueous solution is equal to or greater than the solubility of the quinoline derivative in the aqueous solution.

Furthermore, the particle size of the quinoline derivative contained in the obtained dispersion of the quinoline derivative can be controlled within a range of from 40 nm to 150 nm.

The mixing ratio of the reaction liquid and the aqueous solution is one of the control parameters for the particle size.

EXAMPLES

The present invention is described below in greater detail with reference to examples thereof. However, the present invention is not limited to the examples.

Example 1

The present example was implemented by a synthesis route, such as shown by reaction scheme (1) below.

Reaction Scheme (1)

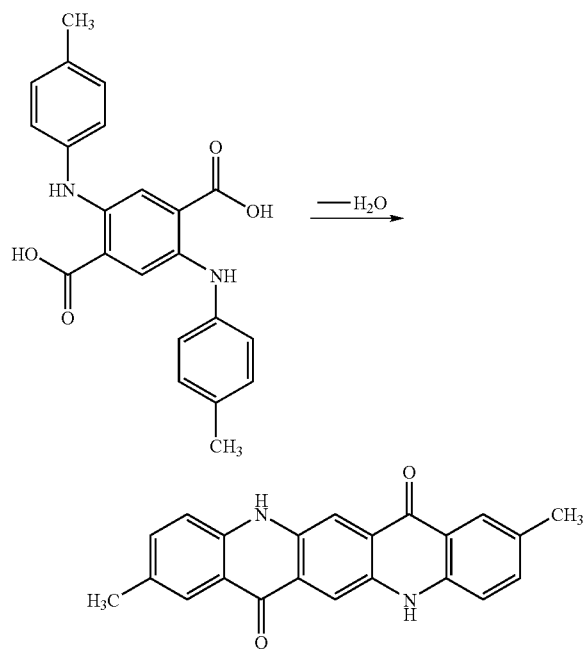

In the present example, 2,5-di-(p-toluidino)-terephthalic acid was used as an N-arylanthranilic acid derivative. A total of 10 parts of 2,5-di(p-toluidino)-terephthalic acid was placed into an eggplant-shaped 100 mL flask, 30 parts of methanesulfonic acid was added thereto at normal temperature and a solution was prepared.

The eggplant-shaped flask was immersed in an oil bath heated to a temperature of 160° C., and stirring under heating was performed for 10 minutes under an argon gas atmosphere. The solution changed color from yellow to deep blue-purple, the formation of 2,9-dimethylquinacridone, which is a quinoline derivative, by a condensation ring-closing reaction was confirmed, and the product was taken as a reaction liquid. The reaction liquid was cooled to normal temperature, 15 parts of sodium dodecylsulfate was added as a dispersant, and stirring was performed.

A micro-sized flow channel 2a, such as shown in FIG. 1, was used to supply the fluids to a mixing field 1. The micro-sized flow channel 2a for supplying the reaction liquid 4a having the dispersant added thereto to the mixing field 1 was formed from a glass round pipe and the diameter of an opening 3a thereof was 900 μm. The reaction liquid 4a was supplied to the mixing field at a flow rate of 5 mL/min by using a syringe pump.

Yet another micro-sized flow channel 2b was formed from a round pipe made from glass that had a diameter of an opening 3b of 500 μm. This micro-sized flow channel 2b served to supply a 0.14N aqueous solution of potassium hydroxide 4b. This solution was supplied to the mixing field at a flow rate of 10 mL/min by using a syringe pump.

These two fluids merged in the mixing field 1 provided in air, particles of 2,9-dimethylquinacridone were instantaneously produced and dispersed, and a dispersion of magenta color was obtained at a high concentration. The particles of the obtained dispersion had a very uniform diameter, and the mean particle size was 70 nm. The content of 2,9-dimethylquinacridone particles contained in the dispersion was 6 wt. %.

The dispersion liquid obtained was subjected to ultrafiltration, purification, and concentration. Because the original dispersion that was obtained had a high concentration, the processing could be completed within a short period of time.

The obtained quinacridone was used as a coloration pigment (C. I. Pigment Red-122), the dispersion thereof was used as an ink-jet ink, the ink was loaded into an ink tank of a BJ Printer S530 (manufactured by Canon Inc.), and printing was performed on the typical paper. The printing produced beautiful text.

Comparative Example 1

A total of 10 parts of 2,5-di-(p-toluidino)terephthalic acid and 15 parts of sodium dodecylsulfate were introduced into an eggplant-shaped 100 mL flask, and 30 parts of concentrated sulfuric acid was added thereto at normal temperature to prepare a solution. The solution color changed to deep brown. The eggplant-shaped flask was immersed in an oil bath heated to 160° C., and stirring under heating was performed for 10 minutes under an argon gas atmosphere. The solution was colored black and dissolution of sodium dodecylsulfate was confirmed.

Example 2

The present example was implemented by a synthesis route, such as shown by reaction scheme (2) below.

Reaction Scheme (2)

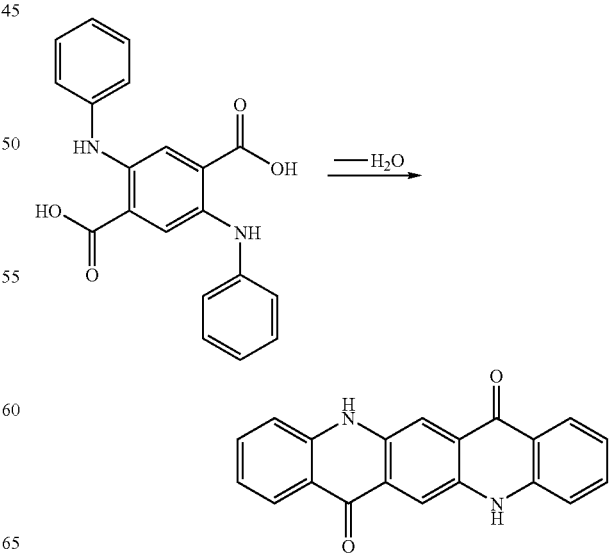

In the present example, 2,5-dianilinoterephthalic acid was used as an N-arylanthranilic acid derivative. A total of 10 parts of 2,5-dianilinoterephthalic acid was placed into an eggplant-shaped 100 mL flask, 40 parts of dodecylbenzenesulfonic acid was added thereto at normal temperature, and a solution was prepared.

The eggplant-shaped flask was immersed in an oil bath heated to a temperature of 160° C., and stirring under heating was performed for 10 min under an argon gas atmosphere. The solution changed color from yellow to deep blue-purple, the formation of dimethylquinacridone, which is a quinoline derivative, by a condensation ring-closing reaction was confirmed, and the product was taken as a reaction liquid.

Figure 2:
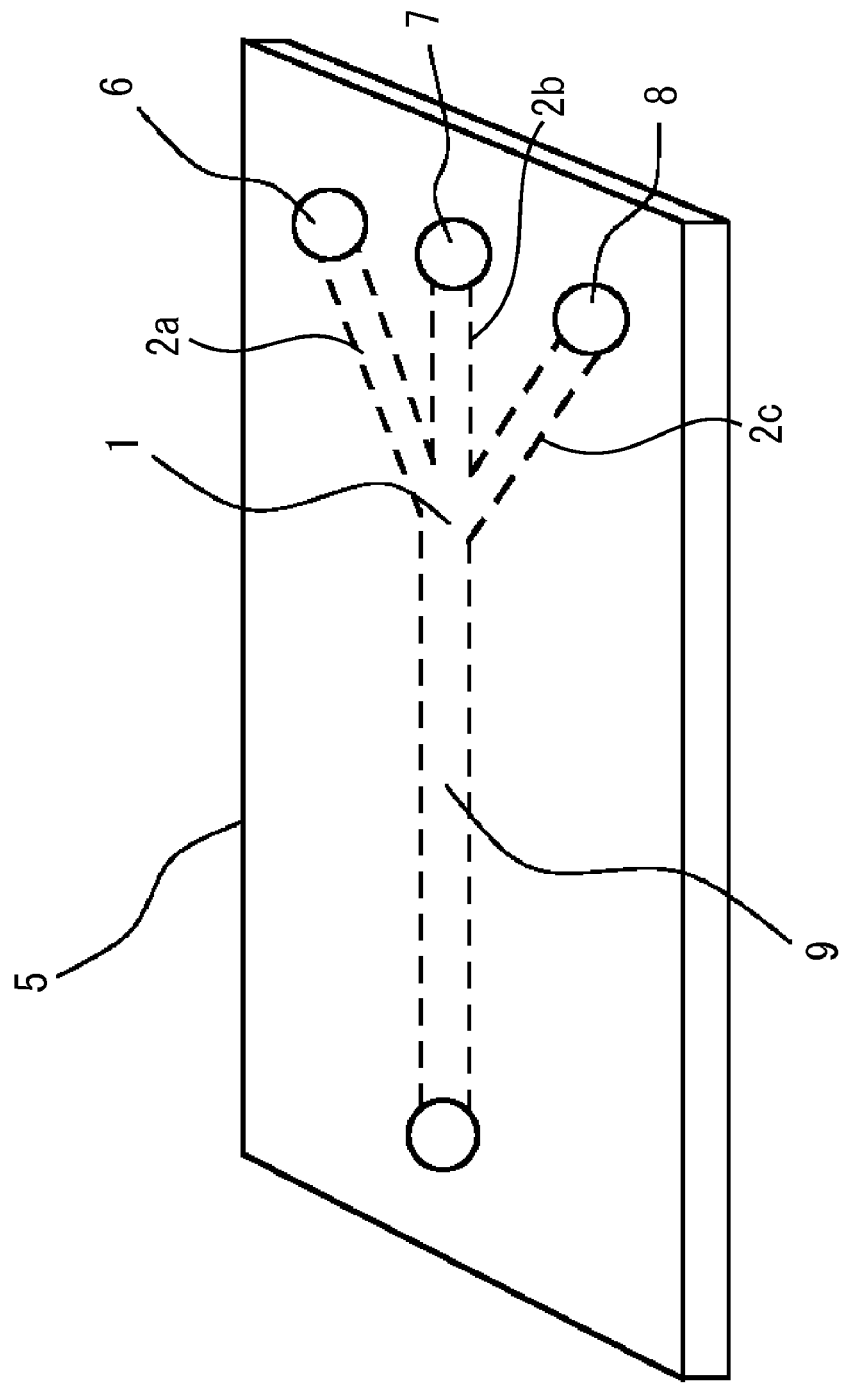
FIG. 2 illustrates schematically a microreactor used in Example 1 of the present invention.

A microreactor 5 with a microscale-sized micro-channel 9 capable of mixing three liquids, such as shown in FIG. 2, was used as a mixing field 1. The microreactor 5 was used upon immersing in ice water. The channel width of the mixing field 1 in the microreactor was 300 μm and the depth was 100 μm. The reaction liquid having a dispersant added thereto was supplied from a supply port 6 of the microreactor 5 into the mixing field through a micro-sized flow channel 2a at a flow rate of 5 mL/min. An ion-exchange water was supplied from a supply port 7 into the mixing field through a micro-sized flow channel 2b at a flow rate of 5 mL/min. A 0.14 N aqueous solution of potassium hydroxide was supplied from a supply port 8 into the mixing field through a micro-sized flow channel 2c at a flow rate of 5 mL/min. These three fluids merged in the mixing field, quinacridone particles were instantaneously formed and dispersed, and a dispersion of a blue-purple color was obtained at a high concentration. The particles of the obtained dispersion had a very uniform diameter, and the mean particle size was 90 nm. The content of quinacridone particles contained in the dispersion was 6.6 wt. %. In the present example, the dodecylbenzenesulfonic acid, used as an organosulfonic acid, also functioned as an anionic dispersant.

Example 3

The present example was implemented by a synthesis route, such as shown by reaction scheme (3) below.

Reaction Scheme (3)

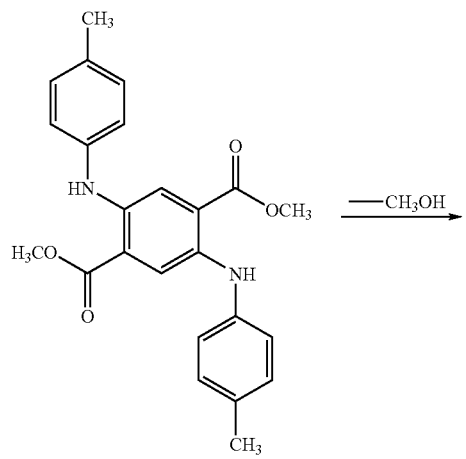

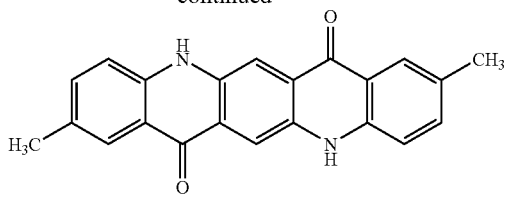

In the present example, a methyl ester of 2,5-di-(p-toluidino)-terephthalic acid was used as an N-arylanthranilic acid derivative. A total of 10 parts of this compound was placed into an eggplant-shaped 100 mL flask, 10 parts of p-toluenesulfonic acid was added thereto at normal temperature, the components were heated to 110° C., and a solution was prepared. The eggplant-shaped flask was immersed in an oil bath heated to a temperature of 180° C., and stirring under heating was performed for 10 minutes under an argon gas atmosphere.

The solution changed color from yellow to deep blue-purple, the formation of 2,9-dimethylquinacridone, which is a quinoline derivative, by a condensation ring-closing reaction was confirmed, and the product was taken as a reaction liquid. The reaction liquid was cooled to 110° C., 15 parts of sodium dodecylsulfate was added as a dispersant, and stirring was performed.

A total of 10 parts of an aqueous solution of 0.14N sodium hydroxide was added to the eggplant-shaped flask immersed in ice water, stirring was performed with a magnetic stirrer, and the reaction liquid having a dispersant added thereto and maintained at a liquid temperature of 110° C. was dropwise added. As a result, particles of 2,9-dimethylquinacridone were instantaneously produced and dispersed, and a dispersion of a magenta color was obtained with a high concentration.

The particles of the obtained dispersion had a very uniform diameter, and the mean particle size was 135 nm. The content of 2,9-dimethylquinacridone particles in the dispersion was 22 wt. %.

Comparative Example 2

A total of 10 parts of 2,5-dianilinoterephthalic acid was introduced in an eggplant-shaped 100 mL flask and 30 parts of polyphosphoric acid was added thereto at normal temperature to prepare a solution. The eggplant-shaped flask was immersed in an oil bath heated to 160° C., and stirring under heating was performed for 10 minutes under an argon gas atmosphere. The solution color changed from yellow to deep blue-purple, the formation of diquinacridone by the condensation ring-closing reaction was confirmed, and the solution was taken as a reaction liquid.

A total of 15 parts of polyoxyethylene lauryl ether was added to the reaction liquid maintained at 160° C. and stirring was performed. The reaction liquid was colored black and the dissolution of polyoxyethylene lauryl ether was confirmed. A total of 10 parts of an aqueous solution of 0.14N sodium hydroxide was added to the eggplant-shaped flask immersed in ice water, stirring was performed with a magnetic stirrer, and the reaction liquid having a dispersant added thereto and maintained at a liquid temperature of 110° C. was dropwise added. As a result, quinacridone particles were produced and the production of blue-purple quinacridone was confirmed, but most of the particles immediately precipitated.

While the present invention has been described with reference to exemplary embodiments, it is to be understood that the invention is not limited to these exemplary embodiments. The scope of the following claims is to be accorded the broadest interpretation so as to encompass all such modifications and equivalent structures and functions.

This application claims the benefit of Japanese Patent Application No. 2007-190016, filed Jul. 20, 2007, which is hereby incorporated by reference herein in its entirety.

What is claimed is:

1. A method for manufacturing a dispersion of a quinacridone compound comprising the steps of:
    preparing a solution by dissolving an N-arylanthranilic acid in an organosulfonic acid;
    heating the solution and obtaining a reaction liquid in which a quinacridone compound has been produced by a condensation ring-closing reaction;
    ejecting the reaction liquid and an aqueous solution from flow channels whose openings to eject the reaction liquid and the aqueous solution are provided in an open space; and
    contacting the reaction liquid with the aqueous solution in the presence of a dispersant in the open space, such that a Reynolds number related to the space and liquid flows is more than 2000, to obtain the dispersion of the quinacridone compound.

2. The method according to claim 1, wherein the preparing step is accompanied by heating.

3. The method according to claim 1, wherein the condensation ring-closing reaction is performed at a temperature within a range of from 60° C. to 220° C.

4. The method according to claim 1, wherein the condensation ring-closing reaction is performed under an inert gas atmosphere.

5. The method according to claim 1, wherein the mixing step is performed at a temperature lower than a temperature at which the condensation ring-closing reaction is performed.

6. The method according to claim 5, wherein the mixing step is performed at the temperature within a range of from 10° C. to 170° C.

7. The method according to claim 1, wherein the open space in which the mixing step is performed is a mixing field.

8. The method according to claim 7, wherein at least one of the reaction liquid and the aqueous solution is supplied to the mixing field from a micro-sized flow channel.

9. The method according to claim 1, wherein the aqueous solution is water or an acidic, neutral, or alkaline aqueous solution.

10. A method for manufacturing a dispersion of a quinacridone compound comprising the steps of:
    preparing a solution by dissolving an N-arylanthranilic acid in an organosulfonic acid;
    heating the solution and obtaining a reaction liquid in which a quinacridone compound has been produced by a condensation ring-closing reaction;
    ejecting the reaction liquid and an aqueous alkaline solution from flow channels whose openings to eject the reaction liquid and the aqueous alkaline solution are provided in an open space; and
    contacting the reaction liquid with the aqueous alkaline solution in the open space, such that a Reynolds number related to the space and liquid flows is more than 2000, to obtain the dispersion of the quinacridone compound.

* * * * *